Jan. 12, 1965    R. J. CLANCY ETAL    3,165,351
ADJUSTABLY SUPPORTED SEAT STRUCTURE
Filed April 25, 1962    2 Sheets-Sheet 1
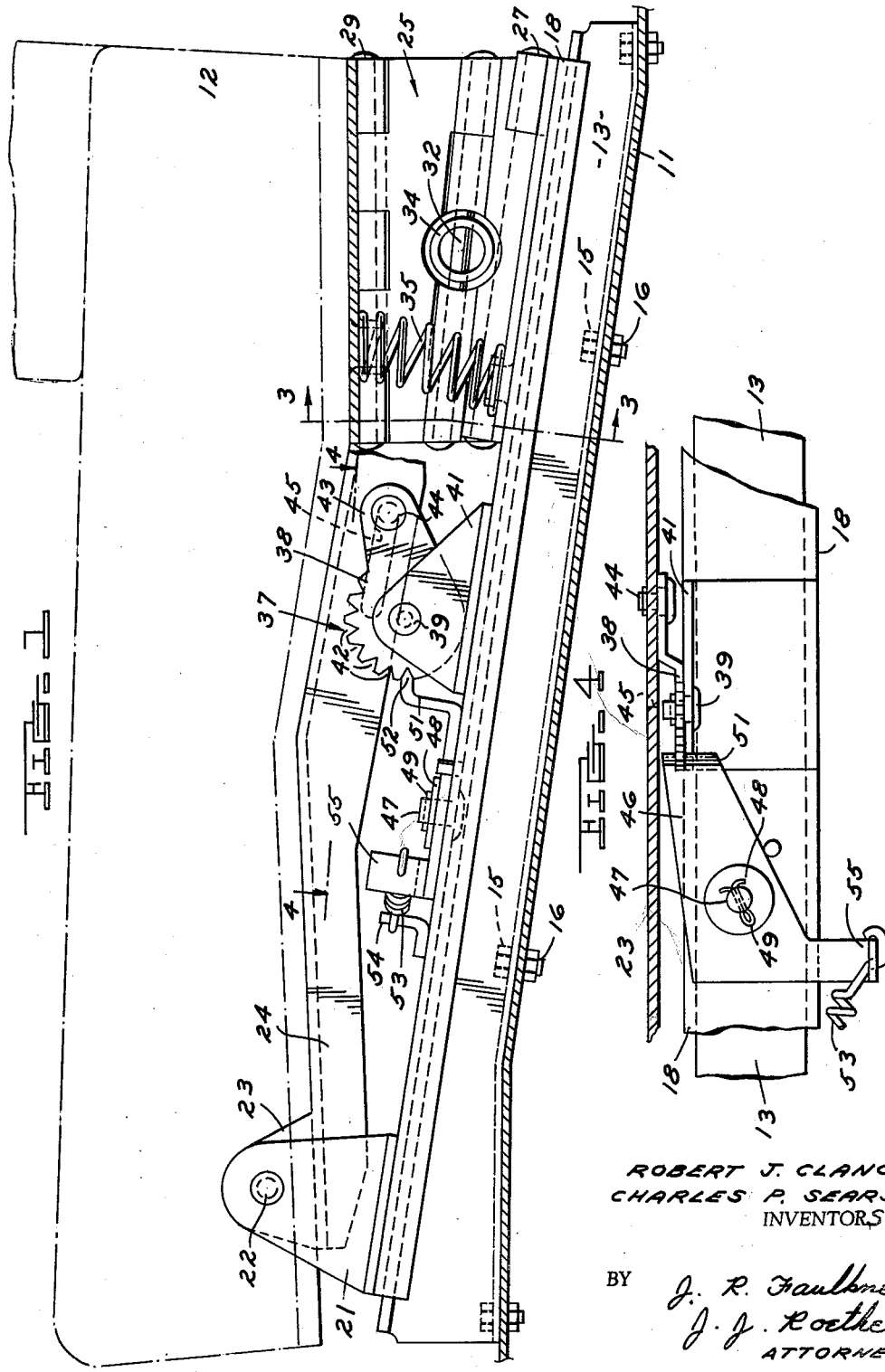
ROBERT J. CLANCY
CHARLES P. SEARS
INVENTORS
BY J. R. Faulkner
J. J. Roethel
ATTORNEYS Jan. 12, 1965   R. J. CLANCY ETAL   3,165,351
ADJUSTABLY SUPPORTED SEAT STRUCTURE
Filed April 25, 1962   2 Sheets-Sheet 2
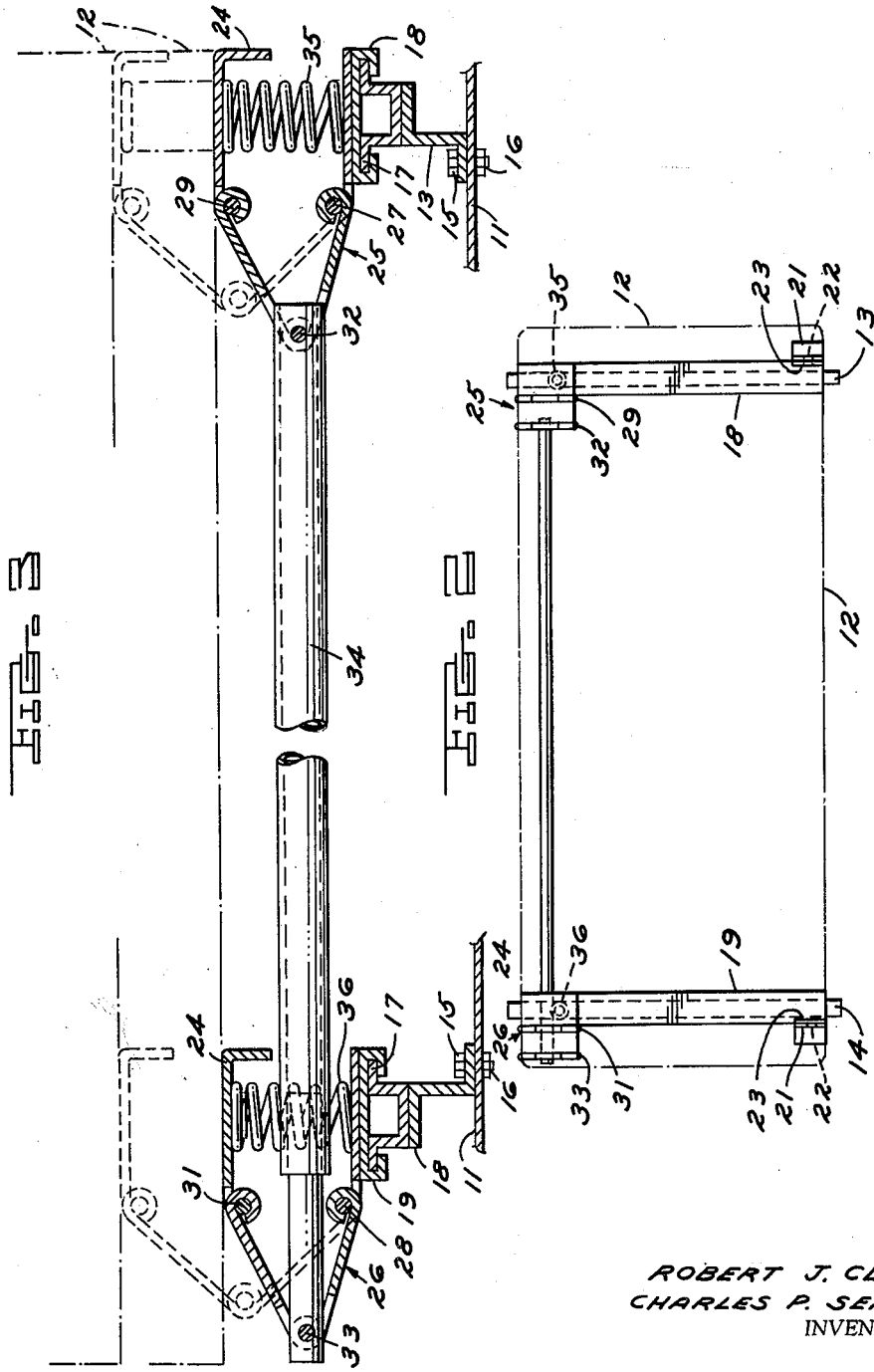
ROBERT J. CLANCY
CHARLES P. SEARS
INVENTORS
BY J. R. Faulkner
J. J. Roethel
ATTORNEYS

United States Patent Office 3,165,351
Patented Jan. 12, 1965

3,165,351
ADJUSTABLY SUPPORTED SEAT STRUCTURE
Robert J. Clancy, Basking Ridge, N.J., and Charles P. Sears, St. Clair Shores, Mich., assignors to Ford Motor Company, Dearborn, Mich., a corporation of Delaware
Filed Apr. 25, 1962, Ser. No. 190,137
2 Claims. (Cl. 296—65)

This invention relates to motor vehicles and more particularly to an adjustably supported seat structure for motor vehicle bodies.

To accommodate persons of differing stature, motor vehicle manufacturers have provided front seat support assemblies that permit the horizontal position of the seat to be adjusted. More recently four and six-way adjustable supports have been offered that also permit the vertical position and tilt of the seat to be adjusted.

Even though the comfort and convenience offered by four and six-way adjustable seats is widely recognized, these devices are installed on only a small percentage of the vehicles produced. Their widest use is in luxury class automobiles. Cost is the prime factor limiting the demand for these seats in lower price vehicles. Production four and six-way seats are primarily power operated and the controls, electric motors and reduction gearing of the power operated seats place the cost of these devices outside the range of the average motor vehicle purchaser.

The rather obvious void created by the absence of a low cost mechanically actuated seat that is capable of multidirection adjustment has not been filled. The unavailability of a simplified support that permits unencumbered movement of the seat for position adjustment has prevented the filling of this gap.

It should be readily apparent that the adjustable supporting mechanism should insure synchronized movement of each side of the seat even if only one side is occupied. If both sides of the seat move simultaneously, the seat can be moved from one position to another for adjustment without binding. It is, therefore, an object of this invention to provide a synchronizing structure that insures simultaneous movement of both sides of a seat during adjustment.

It is a further object of this invention to provide a simplified mechanically actuated seat support that is capable of multidirection adjustment.

In a motor vehicle embodying this invention the seat structure is supported upon the vehicle floor by an adjustable support means. The adjustable support means includes a connection between one edge of the seat structure and the floor that permits relative movement. Extensible means are interposed between the seat structure and floor contiguous to each side of the other edge of the seat structure. The extensible means permits the seat structure to move relative to the floor for adjustment of the seat's position. Motion transmitting means synchronize the movement of the extensible means to permit free movement of the seat structure. Latch means are provided to lock the seat structure in adjusted position.

The extensible means comprise hinge means including a first member that is pivotally connected to the floor structure. A second member of the hinge means is pivotally connected to the seat structure and is also pivotally connected to the first member. A substantially rigid motion transmitting member is pivotally connected to each of the hinges at the point of pivotal connection between their first and second members. The motion transmitting member causes simultaneous movement of the hinges.

Further objects and advantages of this invention will become more apparent as this description proceeds particularly when considered in conjunction with the accompanying drawings, wherein:

FIGURE 1 is a side elevational view of a portion of a motor vehicle body embodying this invention;

FIGURE 2 is a top plan view of the vehicular seat shown in FIGURE 1;

FIGURE 3 is a cross sectional view taken along line 3—3 of FIGURE 1; and

FIGURE 4 is a cross sectional view taken along line 4—4 of FIGURE 1.

Referring now in detail to the drawings, there is shown generally at 11 a floor pan of a motor vehicle body structure. A seat structure 12 is supported above the vehicle floor pan 11 by an adjustable support structure that permits horizontal and tilt adjustment of the seat structure 12.

The mechanism that permits adjustment of the horizontal position of the seat structure 12 consists of left and right side seat tracks 13 and 14 that are secured to the floor pan 11 by bolts 15 and nuts 16. The seat tracks 13 and 14 have T-shaped upper portions 17 that are received in corresponding portions of slide assemblies 18 and 19. The seat structure 12 is supported upon the slide assemblies 18 and 19 by an additional adjusting structure, to be described. The seat structure 12 and the additional adjusting structure may be positioned horizontally relative to the floor 11 by moving the slide assemblies 18 and 19 along the seat tracks 13 and 14 until the desired position is reached. The seat structure 12 may then be locked in the adjusted position by a latch mechanism (not shown). The structure thus far described is conventional.

At each side of the forward edge of the seat structure 12 brackets 21 are welded or otherwise secured to the slides 18 and 19. The brackets 21 have rigidly secured thereto pivot pins 22. Upturned portions 29 of structural members 24 of the seat structure 12 have apertures therein that receive the pivot pins 22 to pivotally support the seat structure 12 thereon.

At each side of the rear edge of the seat structure 12, extensible means comprising left and right side strap hinges 25 and 26 are positioned. The lower leaves of the strap hinges 25 and 26 are pivotally connected with the slides 18 and 19 by lower pivot pins 27 and 28. The upper leaves of the strap hinges 25 and 26 are pivotally connected with the structural members 24 of the seat structure 12 by upper pivot pins 29 and 31. The leaves of each of the strap hinges 25 and 26 are pivotally connected by intermediate pins 32 and 33, respectively.

The strap hinges 25 and 26 permit the seat structure 12 to pivot about the pivot pins 22 for adjustment of the tilt of the seat structure 12. As may be seen in FIGURE 3, the strap hinges 25 and 26 expand and contract to permit the rear edge of the seat structure 12 to move vertically. To insure simultaneous, uniform movement of each side of the seat structure 12 during the tilt adjustment, the intermediate pivot pins 32 and 33 of the strap hinges 25 and 26 are interconnected by an elongated tubular member 34. The tubular member 34 is pivotally connected to the pivot pins 32 and 33 to cause movement of one of the pivot pins 32 and 33 to be accompanied by simultaneous movement of the other pivot pin at the same rate and in the same direction. A simplified construction is thereby provided that insures simultaneous movement of each side of the seat structure 12 to permit free movement thereof for adjustment.

To assist in the tilt adjustment of the seat structure 12, coil springs 35 and 36 are interposed between the slides 18 and 19 and the structural members 24 of the seat structure 12. The coil springs 35 and 36 normally urge the rear edge of the seat structure 12 toward an upward position indicated in phantom in FIGURE 3. The rate of the coil springs 35 and 36 and their preload is selected so they exert an upward force on the seat structure 12 that is slightly less than the combined weight of the seat structure 12 and a normal occupant. The weight of the occupant in the seat structure 12 will thereby normally cause the seat structure 12 to pivot downwardly at its rear edge about the pivot pins 22. By relieving a portion of the weight of the occupant in the seat, the seat structure 12 may pivot upwardly at its rear edge about the pivot pins 22 under the influence of the coil springs 35 and 36.

A latch mechanism generally indicated at 37 and shown in detail in FIGURES 1 and 4 is provided to lock the seat structure 12 in the desired tilt position. The latch assembly 37 includes a member 38 that is pivotally supported upon a pin 39 affixed to a bracket 41. The bracket 41 is welded or otherwise secured to the slide 18. The member 38 has a segmented gear portion including a plurality of teeth 42. The member 38 also has an arm portion 43 that carries a pin 44 that registers a longitudinal slot 44 formed in the structural member 24 of the seat structure 12. It should be readily apparent that as the seat structure 12 pivots about the pivot pins 22, the pin 44 will move along the slot 45 causing the member 38 to pivot about the pin 39.

A locking member 46 is pivotally supported on the slide 18 by a pivot pin 47. The locking member 46 is axially fixed on the pivot pin 47 by a washer 48 and a cotter key 49. The locking member 46 has an upturned portion 51 which includes a pawl 52 adapted to register between the teeth 42 of the member 38. This prevents rotation of the member 38 and, accordingly, a change in the tilt position of the seat structure 12. A coil spring 53 is interconnected between the locking member 46 and a member 54 that is rigidly secured to the slide 18. The coil spring 54 exerts a pressure upon the locking member 46 that urges the pawl portion 52 into registry between the teeth 42 of the member 38.

The locking member 46 has an actuating portion 55 that extends outwardly toward the side of the seat structure 12 and is accessible by the occupant of the driver's portion of the seat structure 12. By rotating the locking member 46 in a counterclockwise direction about the pivot pin 47 the pawl portion 52 is moved free from between the teeth 42 of the member 38 against the action of spring 53. This permits the seat structure 12 to be pivoted about the pins 22 to a new tilt position.

When the locking member 46 is released, the rear edge of the seat structure 12 may be raised by relieving a portion of the weight of the occupant from the seat structure 12. This permits coil springs 35 and 36 to urge the seat structure 12 in an upward direction. If it is desired to move the rear edge of the seat structure 12 in a downward direction, the weight of the occupant of the seat will overcome the action of the springs 35 and 36 to achieve this movement when the locking member 46 is released. Upon reaching the desired position the locking member 46 may be pivoted again about the pivot pin 47 by the action of spring 53 to bring the pawl portion 52 into registry between a new set of the teeth 42. This will lock the seat structure 12 in its new position.

If desired, a similar latching mechanism to that described may be positioned at the right side of the seat structure 12. This additional latch mechanism may be actuated simultaneously with the latch mechanism 37 by connecting this with the latch mechanism 37 by means of the flexible transmitter.

It is to be understood that other changes and modifications may be made without departing from the spirit and scope of the invention as defined by the appended claims.

We claim:
1. In a vehicle body having a supporting floor structure,
   a seat structure,
   and positioning means interposed between said floor structure and said seat structure:
      said positioning means comprising track means fixed to said floor structure and slide means movable on said track means for fore and aft positioning of said seat structure;
      pivot means coupling said seat structure adjacent its fore edge to said slide means;
      a plurality of spaced strap hinges supporting said seat structure at its aft edge on said slide means,
      said strap hinges being selectively extensible or collapsible to raise or lower said aft edge of said seat structure to support the latter in selected tilted relationship to said slide means,
      each of said strap hinges comprising hinge members articulated about pivot axes extending laterally of the pivot axis of said pivot means;
      motion coordinating means coupled to corresponding elements of said strap hinges and extending in parallel relationship to the pivot axis of said pivot means,
      said motion coordinating means synchronizing the movement of said strap hinges in either extensible or collapsible directions;
      and latch means for locking said seat structure in said selected tilted relationship to said slide means,
      said latch means comprising lever means having a pin and slot connection with said seat structure and a ratchet portion pivotally mounted on said slide means,
      and manually releasable ratchet engaging means on said slide means for holding said lever means against pivotal movement.

2. In a vehicle body having a supporting floor structure,
   a seat structure,
   and positioning means interposed between said floor structure and said seat structure:
      said positioning means comprising track means fixed to said floor structure and sldie means movable on said track means for fore and aft positioning of said seat structure;
      pivot means coupling said seat structure adjacent its fore edge to said slide means;
      a plurality of spaced strap hinges supporting said seat structure at its aft edge on said slide means,
      said strap hinges being selectively extensible or collapsible to raise or lower said aft edge of said seat structure to support the latter in selected tilted relationship to said slide means,
      each of said strap hinges comprising hinge members articulated about pivot axes extending laterally of the pivot axis of said pivot means;
      motion coordinating means coupled to corresponding elements of said strap hinges and extending in parallel relationship to the pivot axis of said pivot means,
      said motion coordinating means synchronizing the movement of said strap hinges in either extensible or collapsible directions;

latch means for locking said seat structure in said selected tilted relationship to said slide means, said latch means comprising lever means having a pin and slot connection with said seat structure and a ratchet portion pivotally mounted on said slide means, and manually releasable ratchet engaging means on said slide means for holding said lever means against pivotal movement; compression spring means interposed between spaced opposing portions of said seat structure and said slide means in juxtaposition to said strap hinges, said compression springs means urging said strap hinges in extensible direction and thereby said structure in tilted relationship to said slide means upon release of said latch means.

References Cited in the file of this patent
UNITED STATES PATENTS

| | | |
|---|---|---|
| 2,227,764 | Saunders et al. | Jan. 7, 1941 |
| 2,875,809 | Ragsdale et al. | Mar. 3, 1959 |

FOREIGN PATENTS

| | | |
|---|---|---|
| 29,127 of 1909 | Great Britain | Aug. 25, 1910 |
| 551,808 | Great Britain | Mar. 10, 1943 |